(12) United States Patent
Sahebnassagh et al.

(10) Patent No.: US 12,542,011 B2
(45) Date of Patent: Feb. 3, 2026

(54) METHODS AND SYSTEMS FOR MONITORING DRIVING AUTOMATION

(71) Applicant: Matt3r Technologies Inc., Vancouver (CA)

(72) Inventors: Amir Sahebnassagh, Vancouver (CA); Seyed Mohsen Mousavi Khalkhali, Vancouver (CA); Hamid Abdollahi, Vancouver (CA); Fariduddin Azhar, Vancouver (CA); Amir Mousavi, Vancouver (CA)

(73) Assignee: MATT3R TECHNOLOGIES INC., Vancouver (CA)

( * ) Notice: Subject to any disclaimer, the term of this patent is extended or adjusted under 35 U.S.C. 154(b) by 393 days.

(21) Appl. No.: 17/936,330

(22) Filed: Sep. 28, 2022

(65) Prior Publication Data

US 2023/0098727 A1    Mar. 30, 2023

Related U.S. Application Data

(60) Provisional application No. 63/261,833, filed on Sep. 29, 2021.

(51) Int. Cl.
*G07C 5/02*    (2006.01)
*G06V 10/82*    (2022.01)
(Continued)

(52) U.S. Cl.
CPC .............. *G07C 5/02* (2013.01); *G06V 10/82* (2022.01); *G06V 20/40* (2022.01); *G06V 20/588* (2022.01);
(Continued)

(58) Field of Classification Search
CPC .......... G07C 5/02; G06V 10/82; G06V 20/40; G06V 20/588; H04N 5/77; H04R 1/08; H04R 3/04
See application file for complete search history.

(56) References Cited

U.S. PATENT DOCUMENTS 9,142,064 B2 *  9/2015  Muetzel ................. G07C 5/008
10,147,007 B1    12/2018  Chan et al.
(Continued)

FOREIGN PATENT DOCUMENTS

WO    2018/099876 A1    6/2018
WO    2020/056331 A1    3/2020

OTHER PUBLICATIONS

Holzinger, Jurgen et al., "Objective Assessment of Driveability While Automated Driving", ATZ 1212014, vol. 116, p. 24-28.
(Continued)

*Primary Examiner* — Luke Huynh
(74) *Attorney, Agent, or Firm* — Borden Ladner Gervais LLP; Richard A. Johnson

(57) ABSTRACT

The present disclosure provides methods and systems for monitoring a driving automation system of a vehicle. An example system comprises a vehicle interface for connecting to a forward-facing camera mounted on the vehicle to receive video data, a microphone for recording audio signals from inside the vehicle, an internal measurement unit (IMU) for generating vehicle motion signals comprising at least a lateral acceleration signal, a longitudinal acceleration signal, and a yaw angular acceleration signal, and a processor connected to process the video data, audio signals and vehicle motion signals to determine whether the driving automation signal is engaged or disengaged.

11 Claims, 10 Drawing Sheets

(51) Int. Cl.
    *G06V 20/40*     (2022.01)
    *G06V 20/56*     (2022.01)
    *H04N 5/77*      (2006.01)
    *H04R 1/08*      (2006.01)
    *H04R 3/04*      (2006.01)
    *B60W 60/00*     (2020.01)

(52) U.S. Cl.
    CPC ............... *H04N 5/77* (2013.01); *H04R 1/08* (2013.01); *H04R 3/04* (2013.01); *B60W 60/005* (2020.02); *B60W 2520/105* (2013.01); *B60W 2520/125* (2013.01); *B60W 2520/14* (2013.01); *H04R 2499/13* (2013.01)

(56) References Cited

U.S. PATENT DOCUMENTS

| | | | |
|---|---|---|---|
| 10,380,693 | B2 | 8/2019 | Suiter |
| 10,599,155 | B1 | 3/2020 | Konrardy et al. |
| 10,650,623 | B2 | 5/2020 | Barnes et al. |
| 10,723,362 | B2 | 7/2020 | Dotzler et al. |
| 10,732,627 | B1 | 8/2020 | Roberson et al. |
| 10,885,725 | B2 | 1/2021 | Rodriguez Bravo et al. |
| 10,891,694 | B1 | 1/2021 | Leise et al. |
| 11,037,439 | B1 | 6/2021 | Fields et al. |
| 11,107,164 | B1 | 8/2021 | Davis et al. |
| 11,354,952 | B2 | 6/2022 | Barnes et al. |
| 2018/0292836 | A1 | 10/2018 | Laur et al. |
| 2019/0258251 | A1* | 8/2019 | Ditty ............... G05D 1/0274 |
| 2021/0323545 | A1* | 10/2021 | Jang ............... B60W 40/072 |
| 2022/0234603 | A1* | 7/2022 | Mujumdar ............ B60W 40/09 |

OTHER PUBLICATIONS

Thompson, Cadie, "We just got a great picture of how Google's self-driving cars might work", Business Insider India, Jun. 1, 2016.

Yan, Lixin et al., "Driving Mode Decision Making for Intelligent Vehicles in Stressful Traffic Events" Transportation Research Record: Journal of the Transportation Research Board, vol. 2625, Issue 1, 2017, p. 9-19.

Lv, Chen et al., "Analysis of Autopilot Disengagements Occurring During Autonomous Vehicle Testing", IEEE/CAA Journal of Automatica Sinica, vol. 5., No. 1, Jan. 2018.

Sung, Kyungbok et al., "Driving Information Logger With In-Vehicle Communication for Autonomous Vehicle Research", International Conference on Advanced Communications Technology (ICACT), Feb. 11, 2018.

Sheng, Shili et al., "A Case Study of Trust on Autonomous Driving", 2019 IEEE Intelligent Transportation Systems Conference (ITSC), Oct. 27-30, 2019, Auckland, New Zealand, p. 4368-4373.

Rouchitsas, Alexandros et al., "External Human-Machine Interfaces for Autonomous Vehicle-to-Pedestrian Communication: A Review of Empirical Work", Frontiers in Psychology, vol. 10, Article 2757, p. 1-12, Dec. 2019.

Sung, Kyungbok et al., "A Formal and Quantifiable Log Analysis Framework for Test Driving of Autonomous Vehicles", Sensors 2020, 20(5), 1356 [published on Mar. 2, 2020; retrieved from https://www.mdpi.com/1424-8220/20/5/1356/htm].

Hoffman, Connor, "Tesla Model 3: The Complete Guide", Car and Driver, p. 1-21, May 20, 2020.

Wang, Zhi et al., "ACDR: Autonomous-Car Drive Recorder", Journal of Robotics and Mechatronics, 2020, vol. 32 (3), p. 634-637.

Lu, Jin et al., "Design of Human-Machine Interaction Interface to Autonomous Vehicles Based on Multidimensional Perceptual Context", Hindawi Scientific Programming, vol. 2021, Article ID 5859800, 8 pages. (published Nov. 25, 2021; retrieved from https://www.hindawi.com/journals/sp/2021/5859800/).

Vehicle Black Box DSSAD for Autonomous Vehicle, Duvonn Electronics, Jiangsu, China. Retrieved from https://www.made-in-china.com/showroom/5b6766fc636bffe5/product-detailtvZQHNFMQwrX/China-Vehicle-Black-Box-DSSAD-for-Autonomous-Vehicle.html on Sep. 16, 2022.

* cited by examiner

METHODS AND SYSTEMS FOR MONITORING DRIVING AUTOMATION

CROSS REFERENCE TO RELATED APPLICATION

This application claims the benefit of priority of U.S. Provisional Patent Application No. 63/261,833 filed Sep. 29, 2021, which is hereby incorporated herein by reference.

TECHNICAL FIELD

The present disclosure relates to autonomous driving. Particular embodiments relate to detecting and monitoring driving automation systems.

BACKGROUND

With automated driving systems becoming a common feature in modern vehicles, the Society of Automotive Engineers (SAE) has developed a standard (SAE J3016) that provides a taxonomy with detailed definitions for six levels of driving automation. SAE J3016_202104, revised 2021-04-30, lists these levels as: Level 0: No Driving Automation; Level 1: Driver Assistance; Level 2: Partial Driving Automation; Level 3: Conditional Driving Automation; Level 4: High Driving Automation; and Level 5: Full Driving Automation.

Advanced driving assistance systems (ADAS) such as Tesla Autopilot, Cadillac Super Cruise, and Toyota Safety Sense 2.0 fall into the Level 2 category. SAE Level 2 automation level includes ADAS that can take over acceleration, braking, and steering in specific conditions and scenarios. At this level the human driver must be engaged and constantly supervise the assistance systems when they are engaged.

The following table lists a number of current automakers and their respective ADAS which might be available to some or all of their models:

| Vehicle Make | ADAS Name |
| --- | --- |
| Cadillac | Super Cruise |
| Tesla | Autopilot |
| Honda/Acura | Sensing |
| Buick/Chevy | Driver Confidence |
| Toyota/Lexus | Safety Sense 2.0 |
| Lincoln/Ford | Co-Pilot 360 |
| Audi | Pre Sense |
| Hyundai | Hyundai Smart Sense |
| Mercedes Benz | Driver Assistance |
| BMW | Active Driving Assistance |
| Porsche | Active Safe |
| Volvo | Pilot Assist |
| Honda/Acura | Sensing |
| Toyota/Lexus | Safety Sense 2.0 |
| Land Rover | InControl |

The ADAS usually takes multiple sensory inputs such as integrated cameras, LiDAR, and radar, to assess the conditions that are safe for the ADAS to operate. Some existing ADAS implementations may provide users with limited opportunities to interface with and/or get data from the system, but much of the information about the ADAS and its operation is only available to the manufacturer.

The inventors have determined a need for improved methods and systems for monitoring driving automation systems.

SUMMARY

The present disclosure provides invention provides methods and systems for detecting the mode of driving in vehicles with driving automation systems. Detecting system status and activation and deactivation time of driving automation systems has great ramification for assessing the overall driving safety and risk.

One aspect provides a system for monitoring a driving automation system of a vehicle. The system comprises a microphone for recording audio signals from inside the vehicle, a vehicle interface for connecting to a vehicle camera controller to receive video data from forward-facing camera mounted on the vehicle, at least one inertial measurement unit (IMU) for generating vehicle motion signals comprising at least a lateral acceleration signal, a longitudinal acceleration signal, and a yaw angular acceleration signal, a processor connected to receive the audio signals, video data and vehicle motion signals, and a memory accessible to the processor. The processor is configured to generate driving mode determination signals indicative of whether the driving automation system is engaged or disengaged based on the audio signals, the video data, and the vehicle motion signals, and store the driving mode determination signals, the video data, and the vehicle motion signals in the memory.

Another aspect provides a method for monitoring a driving automation system of a vehicle comprising receiving audio signals from one or more microphones in the vehicle, continuously sampling the audio signals to obtain a plurality of audio samples, filtering and transforming the audio samples to obtain an audio spectrogram for each audio sample, comparing the audio spectrogram of each audio sample to a plurality of chime spectrograms, if the audio spectrogram matches an engagement chime spectrogram, recording a start time of the audio sample for that spectrogram as a driving automation engagement time, if the audio spectrogram matches a disengagement chime spectrogram, recording a start time of the audio sample for that spectrogram as a driving automation disengagement time, and if the audio spectrogram does not match any of the plurality of chime spectrograms, discarding the audio sample for that spectrogram.

Another aspect provides a method for monitoring a driving automation system of a vehicle comprising receiving vehicle motion signals comprising a lateral acceleration signal, a longitudinal acceleration signal, and a yaw angular acceleration signal from one or more inertial measurement units (IMUs) mounted on the vehicle, receiving image data from a forward facing camera mounted on the vehicle and processing the image data to generate a lane-center signal, continuously sampling each of the lateral acceleration, a longitudinal acceleration, yaw angular acceleration and lane-center signals to obtain a plurality of sample sets, feeding each sample set into a recurrent neural network (RNN) to determine whether the sample set matches a driving automation control signature, if the sample set matches the driving automation control signature, determining that the driving automation system is engaged, and if the sample set does not match the driving automation control signature, determining that the driving automation system is disengaged.

Another aspect provides a system for monitoring a driving automation system of a vehicle comprising a vehicle interface for connecting to a forward-facing camera mounted on the vehicle to receive video data, a microphone for recording audio signals from inside the vehicle, an inertial measurement unit (IMU) for generating vehicle motion signals comprising at least a lateral acceleration signal, a longitudinal acceleration signal, and a yaw angular acceleration signal, and a processor connected to process the video data, audio signals and vehicle motion signals to determine whether the driving automation signal is engaged or disengaged.

Further aspects of the present disclosure and details of example embodiments are set forth below.

DRAWINGS

The following figures set forth embodiments in which like reference numerals denote like parts. Embodiments are illustrated by way of example and not by way of limitation in the accompanying figures.

Figure 4:
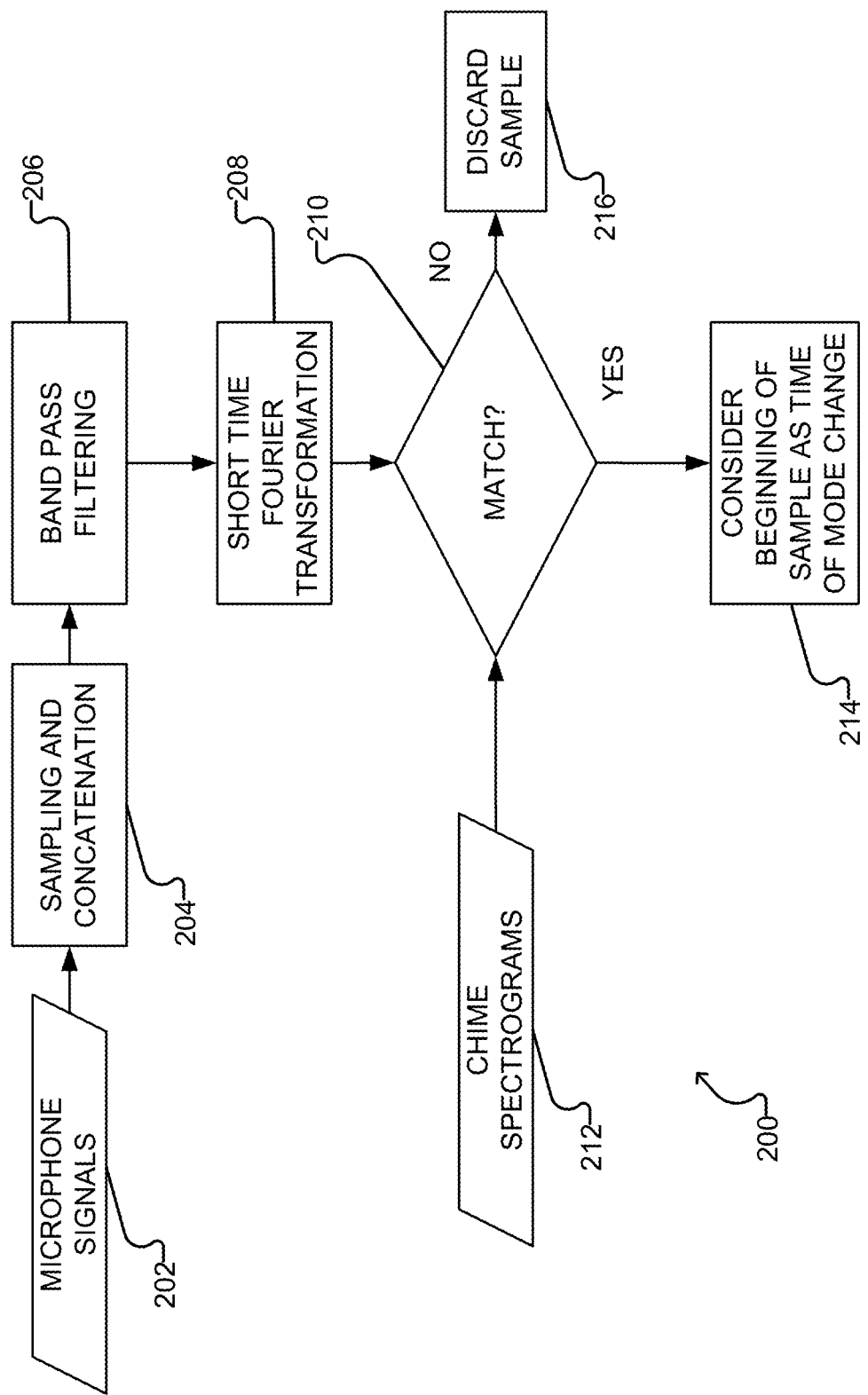

FIG. 4 schematically illustrates an example audio-based driving mode detection method according to the present disclosure.

Figure 5:
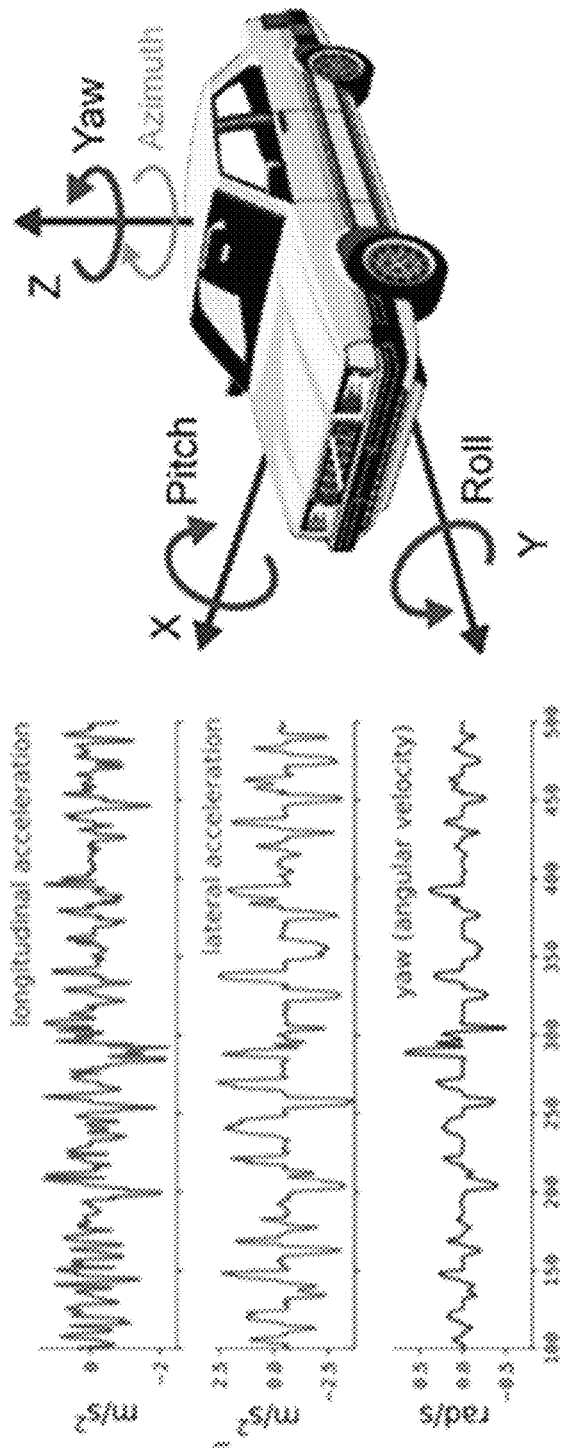

FIG. 5 shows, on the left, example IMU data, and on the right, corresponding coordinates in relation to an example vehicle.

Figure 6:
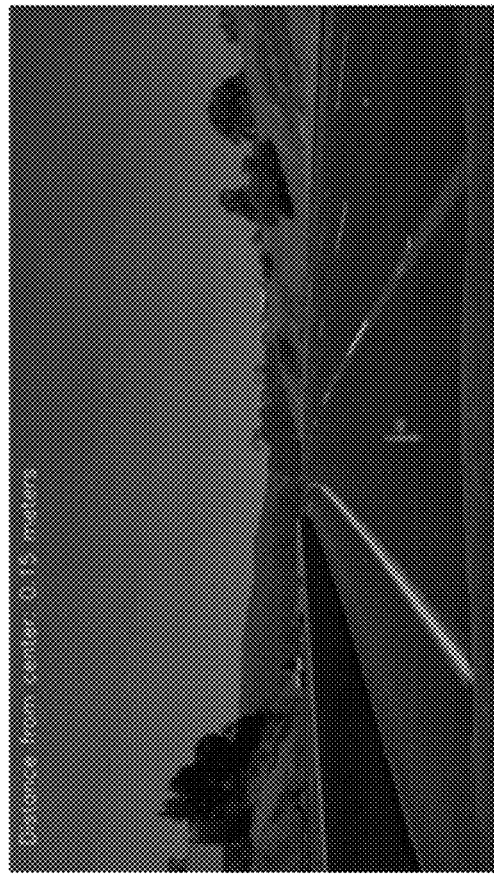

FIG. 6 shows an example image from a forward facing camera mounted on a vehicle.

Figure 7:
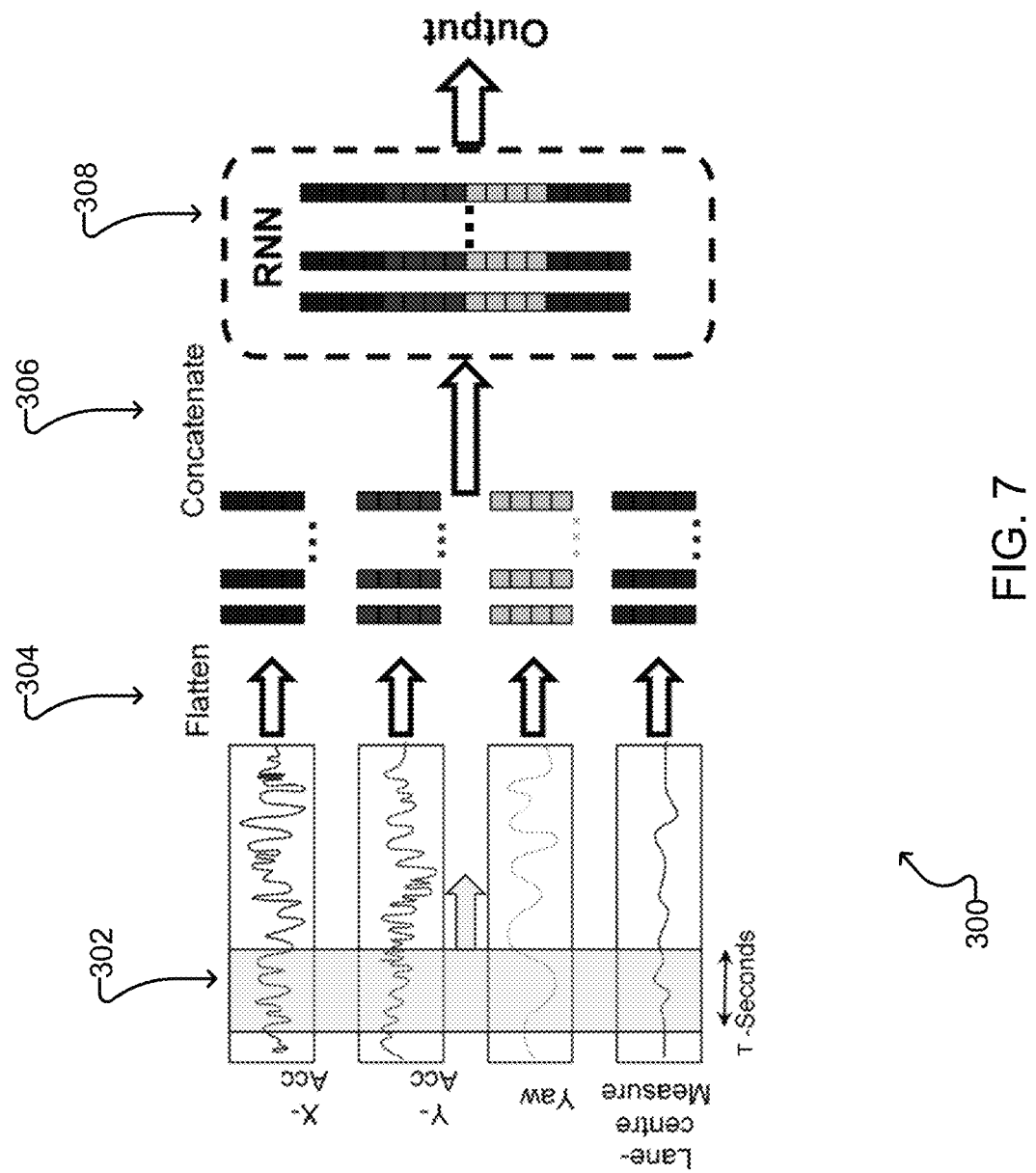

FIG. 7 schematically illustrates an example control signatures-based driving mode detection method according to the present disclosure.

Figure 8:
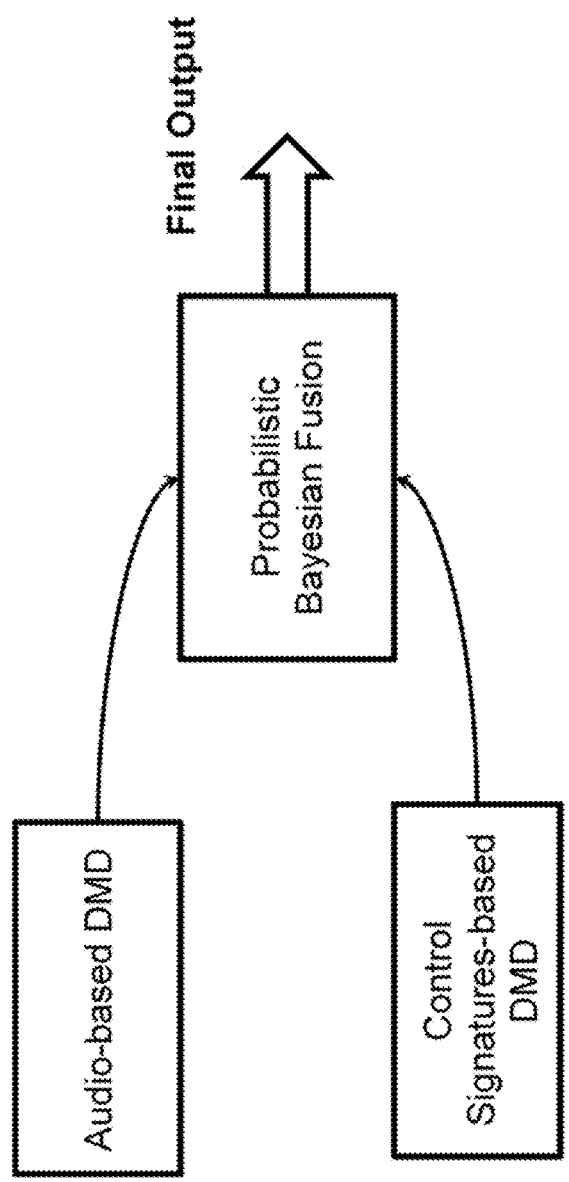

FIG. 8 schematically illustrates an example method that combines the outputs of both the audio-based driving mode detection method of FIG. 4 and the control signatures-based driving mode detection method to produce a final output according to the present disclosure.

Figure 9:
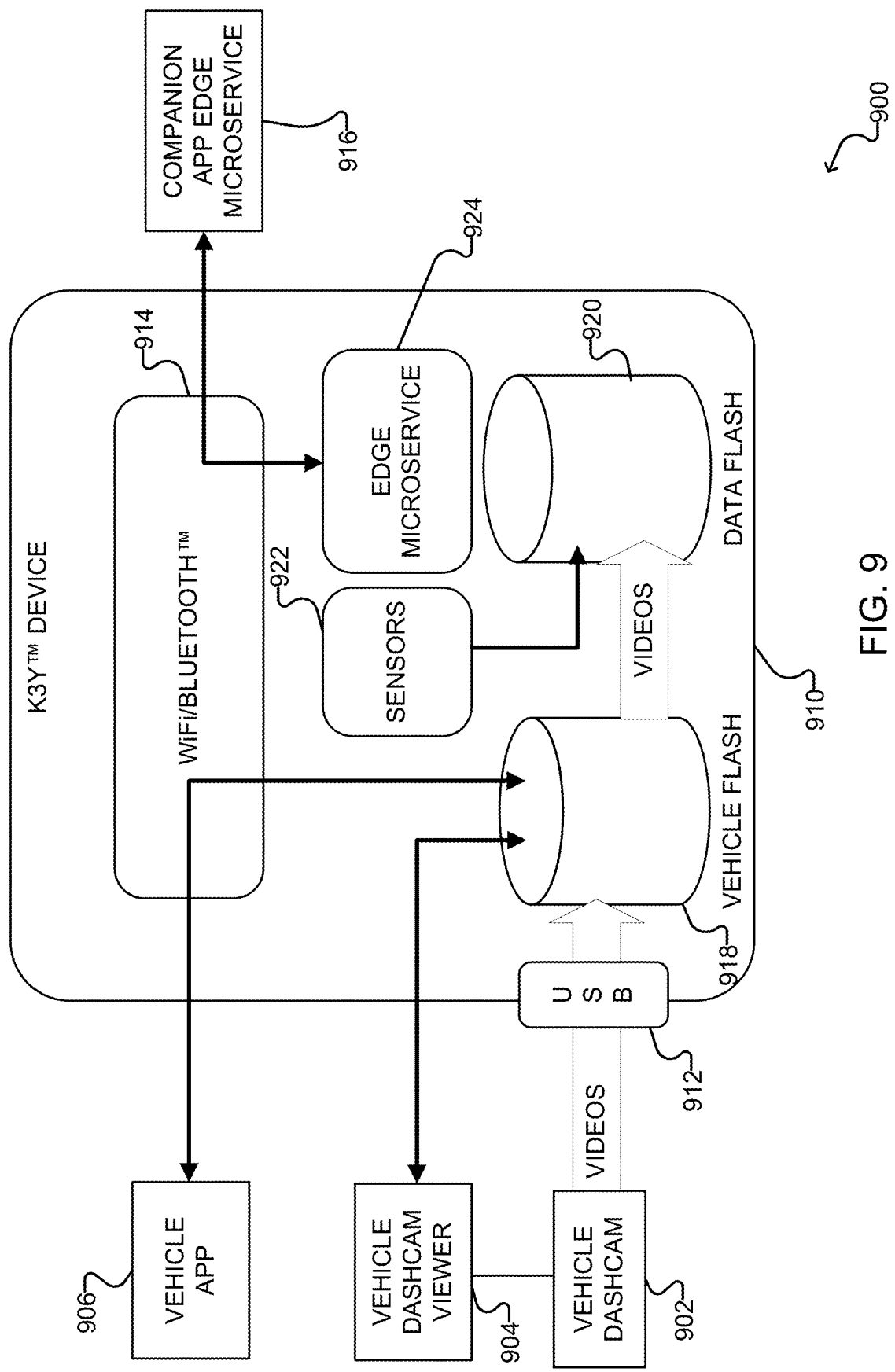

FIG. 9 shows an example driving automation monitoring system according to another embodiment of the present disclosure.

Figure 10:
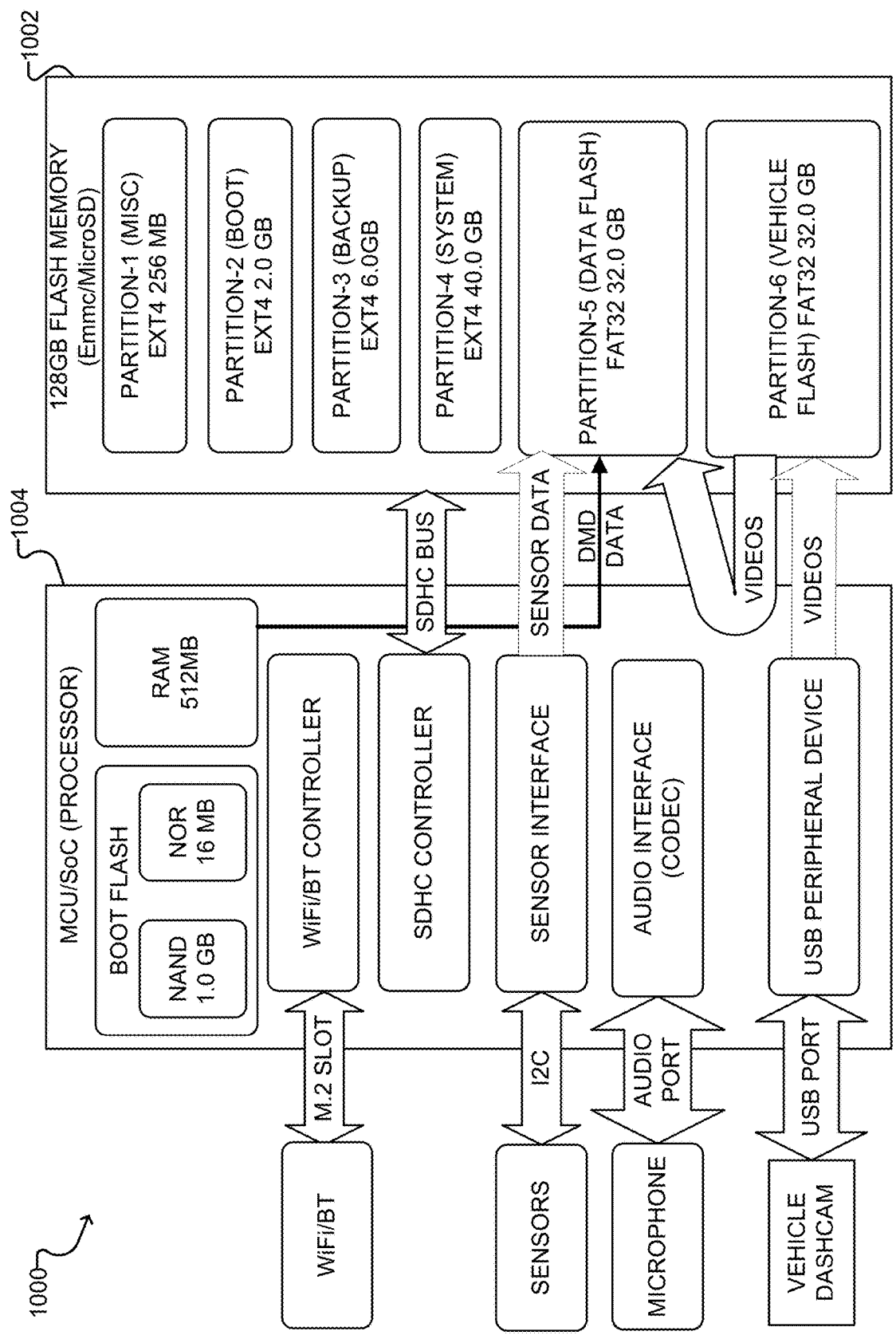

FIG. 10 shows an example hardware architecture for a driving mode detection device according to one embodiment of the present disclosure.

DETAILED DESCRIPTION

The following describes example methods and systems for detecting the mode of driving in vehicles with driving automation systems. The example methods may, for example, be carried out by one of more processors of an automation monitoring system mounted in or on a vehicle. One method for detecting the mode of driving is audio-based and relies on the sounds, referred to herein as "chimes," that are made upon the engagement/disengagement of ADAS. In another method, the system monitors IMU signals and vision signals for a particular set of ADAS controlling signatures during the engagement of such driving automation systems. Other mode detection methods and systems use all of audio, motion and vision data to detect engagement/disengagement of driving automation systems by a combination of two or more different methods to improve accuracy and reduce likelihood of error.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 1:
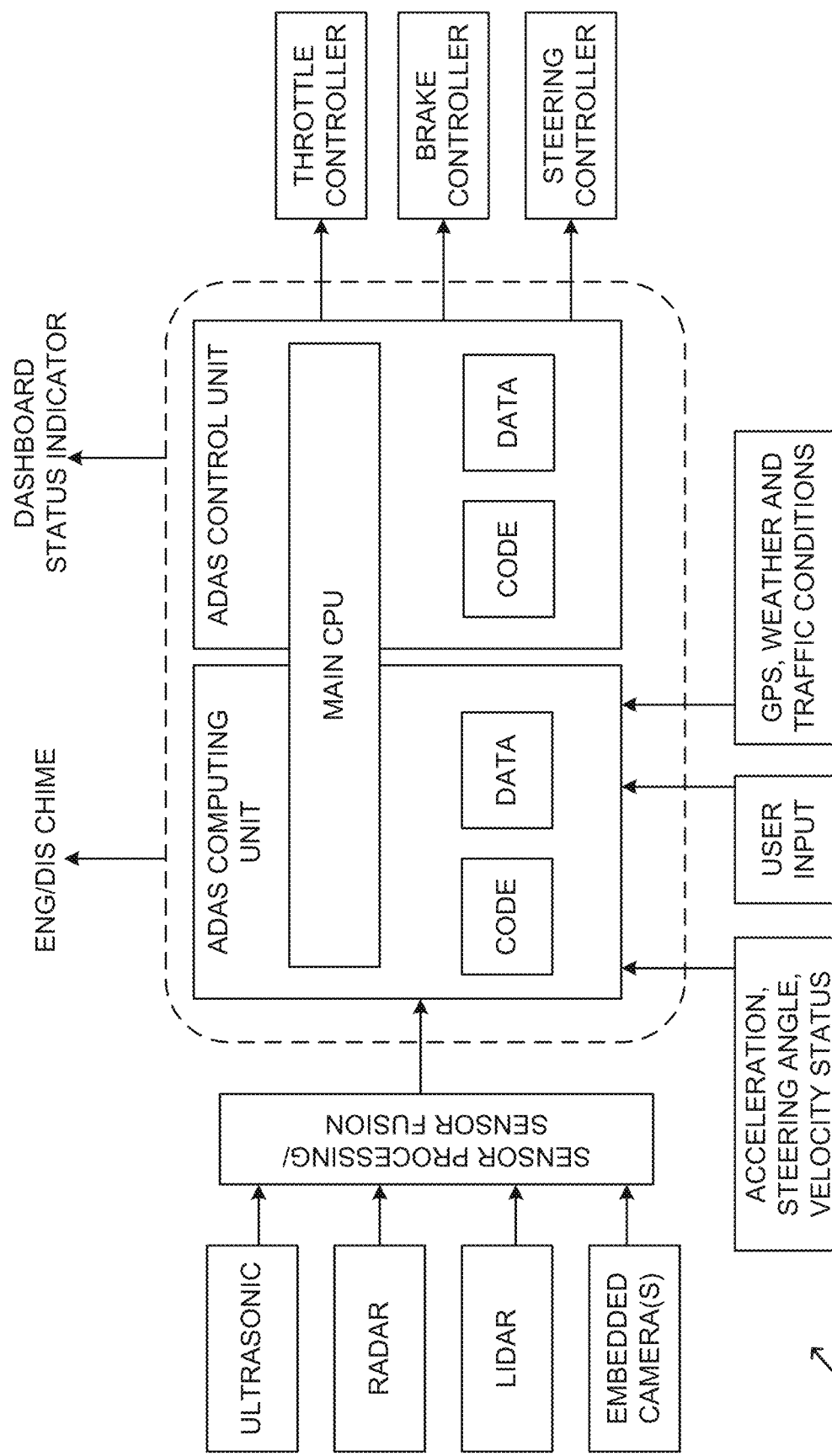
FIG. 1 shows a functional block diagram of an example ADAS according to the prior art.

FIG. 1 shows a functional block diagram of an example ADAS 10 according to the prior art. When the safety conditions are met, the driver is informed, for example by an indicator light in the dashboard or in the car's computer screen. The driver can choose to activate the ADAS at this point usually by a car-specific maneuver on a control lever. Subsequently, a particular sound, referred to herein as a "chime", is made, indicating that the ADAS has been engaged and the driver must supervise its operation. This chime is referred to herein as an "engagement chime" or "eng_chime". The ADAS remains engaged until one of the following scenarios occurs: The ADAS assesses that the road condition has become unsafe for its operation and prompts the driver to take full control, or the driver voluntarily decides to intervene and take control. In both cases another particular chime will be made, indicating that the ADAS has been disengaged and the driver has full control. This chime is referred to herein as a "disengagement chime" or "dis_chime".

Figure 2:
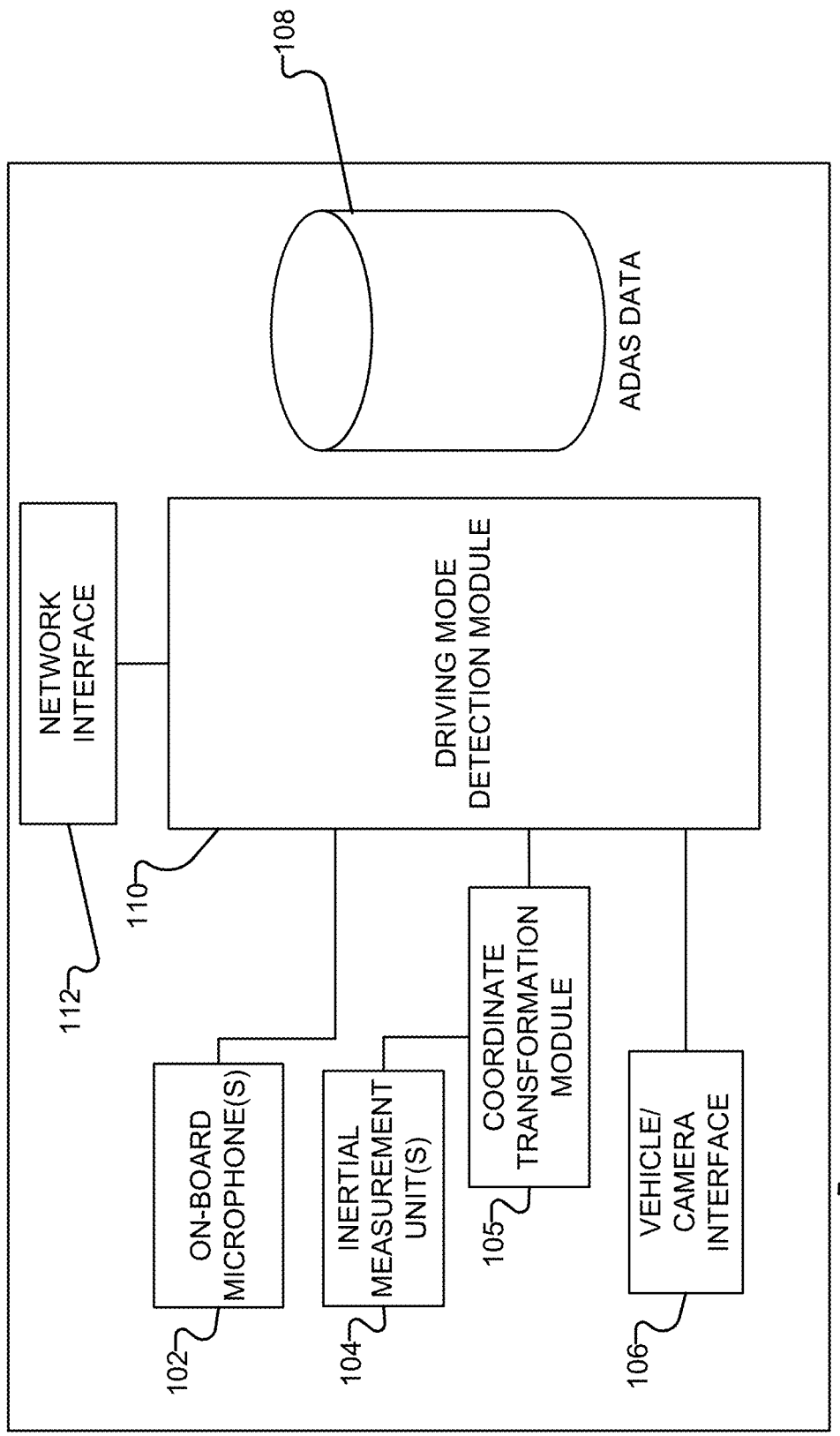
FIG. 2 shows components of an example driving automation monitoring system according to one embodiment of the present disclosure.

FIG. 2 shows components of an example driving automation monitoring system 100 according to one embodiment of the present disclosure. The system 100 may comprise an electronic device configured be mounted in a vehicle with an ADAS by a user to monitor the operation of the ADAS by, for example, connecting the system 100 to a USB port or other interface provided by the vehicle manufacturer. In the illustrated example, the system 100 comprises one or more microphones 102, one or more inertial measurement units (IMUs) 104, a vehicle/camera interface 106, a data store 108, and a driving mode detection (DMD) module 110 configured to detect engagement/disengagement of the ADAS according to one or more of the example methods described below. In the illustrated example, the DMD module 110 is configured to receive motion data in the vehicle's coordinate system, and the system 100 comprises a coordinate transformation module 105 configured to convert signals from the IMU 104 into the vehicle's coordinate system. In some embodiments, the system 100 may be configured to automatically detect an orientation of the IMU 104 in relation to the vehicle orientation and calculate corrections to be applied by the coordinate transformation module 105. In some embodiments, the IMU may be oriented to produce motion signals that are already in the vehicle's coordinate system, or the DMD module 110 may be configured to receive motion data in the IMU's coordinate system, and the coordinate transformation module may be omitted. In some embodiments, the vehicle/camera interface 106 is connected directly to the vehicle (for example where the manufacturer provides a port on the dash for connecting to the dashcams). In some embodiments, the vehicle/camera interface 106 may connect to a camera independently (for example where integrated dashcam connections are not available or readily accessible on a vehicle). The system also comprises a network interface 112 for receiving user commands and providing data to the user (for example, by wirelessly connecting to a user's smartphone or other device running an application for controlling the system 100).

Figure 3A:
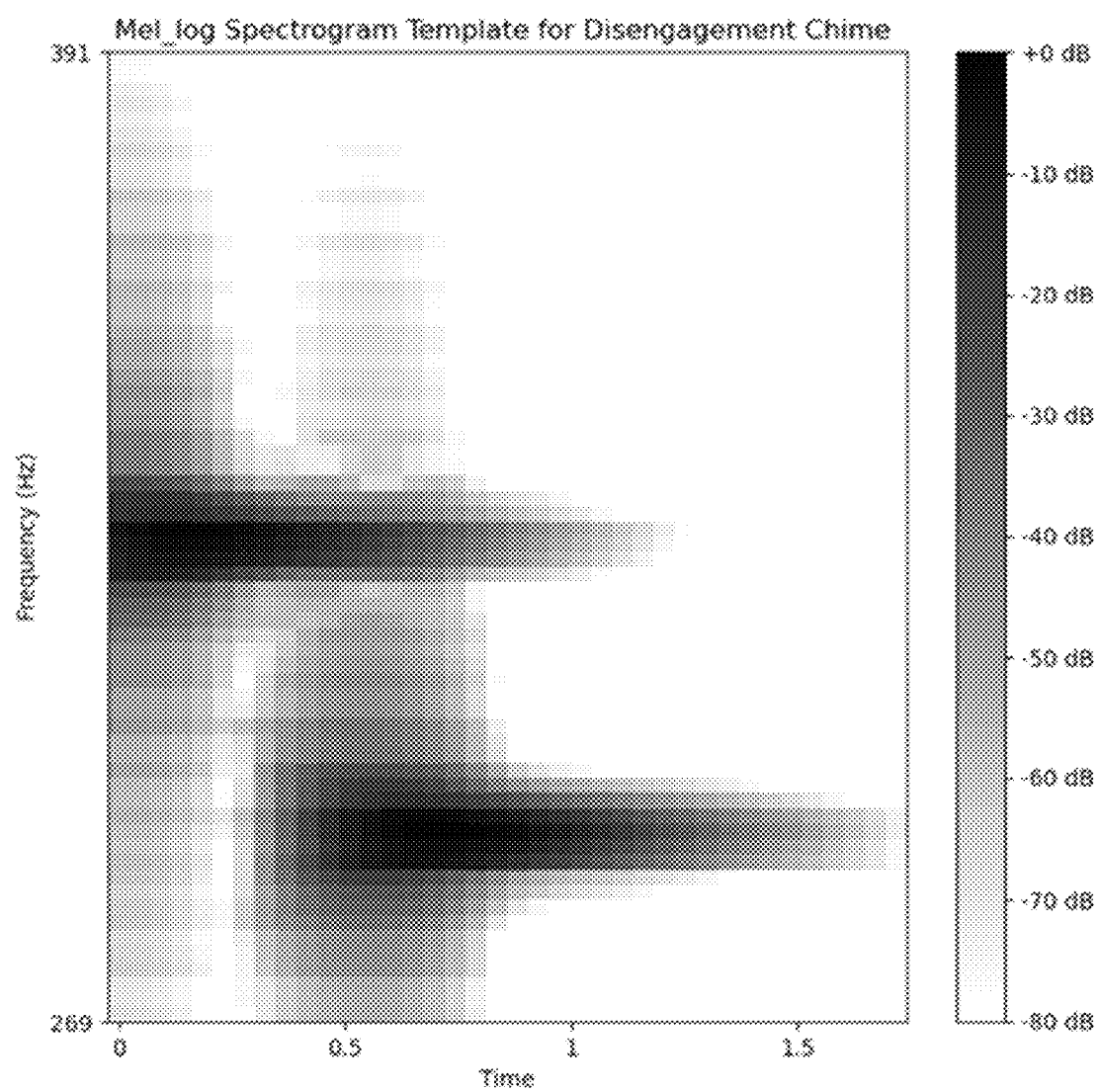
FIG. 3A shows an example audio spectrogram obtained from a disengagement chime from an example ADAS.
Figure 3B:
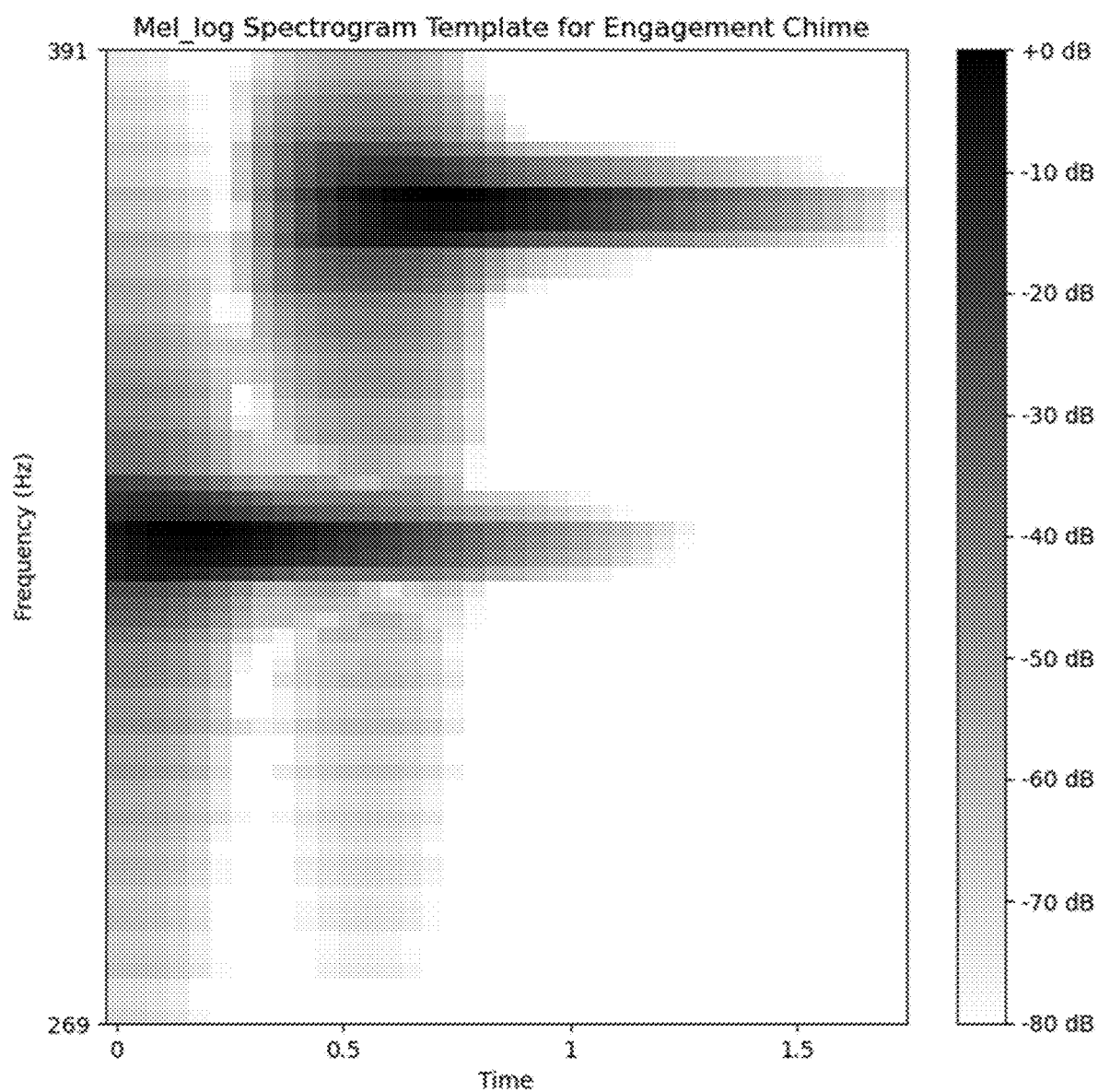
FIG. 3B shows an example audio spectrogram obtained from an engagement chime from an example ADAS.

One method for detecting ADAS engagement/disengagement according to the present disclosure relies only on audio signals, and is based on spectrogram template matching. In this method, the eng_chime and dis_chime for a particular ADAS system are recorded in isolation, for the duration of the chime as denoted by t. The recorded chime is then passed through short-term Fourier transform (STFT) to obtain the audio spectrogram signature of the chimes. These chime spectrograms are stored in a data store accessible to one or more processors implementing an audio-based detection method according to the present disclosure. FIGS. 3A and 3B respectively show example audio spectrograms obtained from disengagement and engagement chimes of a Tesla Autopilot system. As one skilled in the art will appreciate, audio spectrograms obtained from disengagement and engagement chimes from other vehicles may be stored and accessible to the processor(s) to detect engagement and disengagement of the ADAS for any vehicles with audible signals indicating ADAS operation.

FIG. 4 shows a block diagram of an example audio-based method 200 according to the present disclosure. Method 200 may be carried out by a device with audio recording and digital signal processing (DSP) capabilities with one or more microphones to monitor sounds inside a vehicle (such as for example system 100 described above, or another device). During operation of the vehicle, the device receives microphone signals 202 and audio samples are extracted continuously at block 204. Each audio signal has duration of 3×t seconds, where t is the duration of the chimes for the vehicle (or if the engagement and disengagement chimes have different durations, the duration of the longer chime. Each sample beginning covers t seconds of the previous segment in order to make sure chimes that fall into two consecutive samples will be detected. The extracted samples go through a bandpass filter at block 206 to remove the frequencies that are far from the frequencies present in the chimes. A short time Fourier transform (STFT) is then performed on the output of the filter at block 208 in order to obtain its spectrogram. A template matching is then performed at block 210 using Euclidean metric to assess if any of the chimes spectrograms 212 are present in the audio sample spectrogram. If a match is found (block 210 YES output), the audio sample will be saved and time stamped with the start time of the sample as the detection time at block 214. If a match is not found (block 210 NO output), the sample is discarded at block 216.

Some methods for detecting ADAS engagement/disengagement according to the present disclosure rely on motion and video signals, and exploit certain characteristics of the ADAS during the activation periods to look for "control signatures" in the motion and video signals for detecting the mode of driving. In particular, the example method discussed below receives signals indicating lateral and longitudinal accelerations as well as yaw (i.e., angular velocity in the vertical axis) from an IMU in the vehicle's coordinate system, as well as a lane centering signal derived from image data from a forward facing camera. FIG. 5 shows, on the left, example IMU data (in the vehicle's coordinate system), and on the right, corresponding coordinates in relation to an example vehicle. The lane centering signal is generated based on video signals and uses the feed from the front camera to detect the driving lane that the vehicle is located in and to find the center of the lane. FIG. 6 shows an example image, with the pink centroid indicating the middle of the lane. In the illustrated example, the center of the camera image feed is assumed to line up with the center of the vehicle (green vertical line in FIG. 6), and the lane centering signal is determined as the difference between the pink centroid and the vertical green lane (in pixel) divided by the width of the lane (in pixel). In other embodiments, for example where the camera used to obtain image data is offset from the center of the vehicle, the center of the vehicle may be offset from the center of the camera image feed by a corresponding amount. This lane-center measure will fall between −1 and 1. As schematically illustrated in FIG. 7, in an example method 300 the data from these four sources is sampled at 302 in T-second periods. In some embodiments, the T-seconds sampling periods at step 302 are substantially longer than the sampling periods for the chimes discussed above. At step 304, the samples are flattened, an then concatenated at step 306. The flattened and concatenated samples are then fed into a deep-learning recurrent neural network (RNN) at step 308, to generate an output indicative of whether the ADAS of the vehicle is engaged or disengaged.

As noted above, the audio-based and control signature-based driving mode detection (DMD) methods 200 and 300 can be used in combination or separately. Since the nature of both methods is stochastic and a probability can be assigned to the output of each method, using various fusion strategies for multimodal detection, two methods can be combined to derive a more accurate detection system. For example, in some embodiments a system implementing both of the above DMD methods utilizes probabilistic Bayesian fusion to increase the accuracy, as schematically illustrated in FIG. 8.

FIG. 9 shows an example driving automation monitoring system 900 according to another embodiment of the present disclosure. In the illustrated example, the system 900 is configured for use with a vehicle having a built-in dashcam 902 and dashcam viewer 904, and a vehicle app 906 provided by the vehicle manufacturer. The system 900 comprises a driving mode determination device 910 having one or more processors, with a USB connector 912 for connecting to a USB port on the vehicle, and a network (e.g. Wifi/Bluetooth) interface 914 for wireless communications. The system 900 also comprises a companion app 916 installed on a user's smartphone or other device for allowing a user to control and receive data from the device 910.

The device 910 comprises electronic storage (e.g. eMMC/MicroSD) having two major partitions: a vehicle flash partition 918, and a data flash partition 920. The device 910 also comprises a plurality of sensors 922 (including at least an audio sensor and an IMU) and a processor connected to received signals from the sensors 922 and configured to execute one or more driving mode detection methods according to the present disclosure.

The vehicle flash partition 918 is formatted as per the vehicle manufacturer's USB (or other protocol) specification. The vehicle flash partition 918 is accessible to a vehicle camera controller such as, for example, the dashcam 902 through the USB port, or the vehicle app 906 through a wireless connection. As such the device 910 can perform the functions of a standard storage device for saving video and other data as per the vehicle manufacturer's specifications.

The data flash partition 920 is used for storage of sensor data and driving mode determination data according to the present disclosure, and is only accessible by the processor(s) on device 910, or through the companion app 916. In the illustrated example, the companion app 916 interacts with the data flash partition through an edge microservice 924. In the illustrated example, the device 910 does not have a separate power supply, and is powered from the vehicle's USB port.

The device 910 can function as a USB flash drive, with videos being stored in the vehicle flash partition 918, and accessible by the user through the vehicle's dashcam viewer 904 and/or vehicle app 906 in accordance with the manufacturer's system settings. The vehicle's dashcam viewer 904 and/or vehicle app 906 has full read/write access to the vehicle flash partition 918, but no access to the data flash partition. Similarly, when inserted into a PC/Laptop USB port, an operator will only be able to access the videos saved on vehicle flash partition 918.

An authorized user can access the videos and other data saved on the data flash partition 920 of the device 910 through the companion app 916. In some embodiments, the device 910 authenticates a registered user's smartphone or other device when in close proximity and establishes a secure communication.

In some embodiments, the device is configured to automatically copy videos saved in the vehicle flash partition 918 to the data flash partition 920. For example, in embodiment configured for use with a Tesla Dashcam (available for Model S and Model X cars manufactured after August 2017, and all Model 3 and Y cars), at every 1-min interval, once the video write function is completed by the Tesla Dashcam, these recent video files will be instantly copied from the "TeslaCam/RecentClips" directory on vehicle flash partition 918 to a "VehicleVideos" directory on the data flash partition 920. In some embodiments this is implemented as a Linux daemon/process running in background.

In some embodiments, the system 900 is configured to continuously implement one or more methods according to the present disclosure to determine precisely when the ADAS of the vehicle is engaged and disengaged. In some embodiments the system 900 is configured to store video data and sensor data corresponding to ADAS engagement/disengagement, and/or export such data to remote systems for further processing. For example, in some embodiments, the driving mode determination data and associated vehicle data can be used for risk assessment of ADAS-equipped vehicles, for scenario collection and retrieval, and/or may be provided to a vehicle manufacturer for improving operation of the ADAS itself. In some embodiments, the sensors 922 comprise a microphone and the system 900 continuously samples the audio signals as described above to determine engagement of the ADAS. In some embodiments, the sensors 922 comprise an IMU (and a coordinate transformation module configured to transform motion signals from the IMU's coordinate system to the vehicle's coordinate system) and the system 900 continuously monitors vehicle motion as described above to determine engagement of the ADAS. They sensors may also comprise both a microphone and an IMU and may combine audio- and motion-based methods as described above. In some embodiments, the sensors 922 include not only a microphone and/or IMU, but may also other sensors. For example, in some embodiments the sensors 922 comprise a 3-axis accelerometer, a 3-axis gyroscope, a proximity sensor, an air pressure sensor, a magnetometer (compass), and a temperature sensor.

FIG. 10 shows an example hardware architecture for a driving mode detection device 1000 according to one embodiment of the present disclosure. The high volume of data write operations with some vehicle's dashcam recording may quickly damage a standard USB device, so the device 1000 comprises a robust flash memory 1002 (e.g. a High Endurance (Sandisk) or PRO Endurance (Samsung) eMMC or MicroSD card) for more reliable and longer life data storage. In the illustrated example, a 128 GB eMMC or MicroSD card is shown, which stores all of the software and data, but larger storage may be provided in some embodiments. In the illustrated example, the memory 1002 has six partitions, and interfaces with a main control unit (MCU/SoC) 1004 through the processors' SDHC bus connected via MicroSD adapter. Partitions 1-4 are Ext4 type default operating system (e.g. Linux) partitions used by operating system and application software. Partition-5 named "DataFlash" will be FAT32 type, and is used to store driving mode determination data, vehicle video data, and sensor data (other than audio data). In some embodiments, this partition has three main directories DMDData, VehicleVideos and SensorData in the root directory. Partition-6 named "VehicleFlash" is FAT32 type, formatted as per the vehicle manufacturer's USB specification, and may be used as a USB drive for the vehicle as discussed above. As discussed above, the VehicleFlash partition-6 is accessible by the vehicle's camera controller (e.g. the dashcam viewer and any associated dashcam viewer app, or vehicle manufacturer's smartphone app) through the vehicle's USB port, but the DataFlash partition-5 is only accessible by the system software, or through a companion app for the device 1000.

The embodiments of the systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface. For example, the programmable computers may be a server, network appliance, connected or autonomous vehicle, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Embodiments described herein may relate to various types of computing applications, such as image processing and generation applications, computing resource related applications, speech recognition applications, video processing applications, semiconductor fabrication, and so on. By way of illustrative example embodiments may be described herein in relation to image-related applications.

Throughout the foregoing discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments of the present disclosure may be in the form of a software product. The software product may be stored in a non-volatile or non-transitory storage medium. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A system for monitoring a driving automation system of a vehicle, the system comprising:
    a microphone for recording audio signals from inside the vehicle;
    a vehicle interface for connecting to a vehicle camera controller to receive video data from a forward-facing camera mounted on the vehicle;
    at least one inertial measurement unit (IMU) for generating vehicle motion signals comprising at least a lateral acceleration signal, a longitudinal acceleration signal, and a yaw angular acceleration signal;
    a processor connected to receive the audio signals, video data and vehicle motion signals; and
    a memory accessible to the processor,
    wherein the processor is configured to:
    generate driving mode determination signals indicative of whether the driving automation system is engaged or disengaged based on the audio signals, the video data, and the vehicle motion signals by:
        continuously sampling the audio signals to obtain a plurality of audio samples;
        filtering and transforming the audio samples to obtain an audio spectrogram for each audio sample;
        comparing the audio spectrogram of each audio sample to a plurality of chime spectrograms;
        when the audio spectrogram matches an engagement chime spectrogram, recording a start time of the audio sample for that spectrogram as a driving automation engagement time; and
        when the audio spectrogram matches a disengagement chime spectrogram, recording a start time of the audio sample for that spectrogram as a driving automation disengagement time;
    store the driving mode determination signals, the video data, and the vehicle motion signals in the memory; and
    export the driving mode determination signals, the video data, and the vehicle motion signals to one or more remote systems for further processing.

2. The system of claim 1 wherein the memory comprises a first partition for storing video data received from the forward-facing camera and a second partition for storing the vehicle motion signals and the driving mode determination signals, and the first partition is accessible by the processor and the vehicle camera controller, and the second partition is only accessible by the processor.

3. The system of claim 1 wherein the processor is configured to discard audio signals after generating a corresponding driving mode determination signal.

4. The system of claim 1 wherein the vehicle interface comprises a USB connector for insertion into a USB port on the vehicle.

5. The system of claim 1 wherein the processor is configured to:
process the video data to generate a lane-center signal;
continuously sampling each of the lateral acceleration, longitudinal acceleration, yaw angular acceleration and lane-center signals to obtain a plurality of sample sets;
feed each sample set into a recurrent neural network (RNN) to determine whether the sample set matches a driving automation control signature;
when the sample set matches the driving automation control signature, determine that the driving automation system is engaged; and
when the sample set does not match the driving automation control signature, determine that the driving automation system is disengaged.

6. A method for monitoring a driving automation system of a vehicle, the method comprising:
receiving audio signals from one or more microphones in the vehicle;
continuously sampling the audio signals to obtain a plurality of audio samples;
filtering and transforming the audio samples to obtain an audio spectrogram for each audio sample;
comparing the audio spectrogram of each audio sample to a plurality of chime spectrograms;
when the audio spectrogram matches an engagement chime spectrogram, recording a start time of the audio sample for that spectrogram as a driving automation engagement time;
when the audio spectrogram matches a disengagement chime spectrogram, recording a start time of the audio sample for that spectrogram as a driving automation disengagement time;
recording associated vehicle data corresponding to each driving automation engagement time and each driving automation disengagement time to generate a plurality of driving automation scenarios; and
exporting the plurality of driving automation scenarios to one or more remote systems for further processing.

7. The method of claim 6 comprising discarding each audio sample after comparing its audio spectrogram to the plurality of chime spectrograms.

8. The method of claim 6 wherein recording associated vehicle data comprises recording image data corresponding to the driving automation engagement time or driving automation disengagement time.

9. The method of claim 6 wherein recording associated vehicle data comprises recording vehicle motion signals corresponding to the driving automation engagement time or driving automation disengagement time.

10. The method of claim 6 wherein recording associated vehicle data comprises recording image data and vehicle motion signals corresponding to the driving automation engagement time or driving automation disengagement time.

11. A method for monitoring a driving automation system of a vehicle, the method comprising:
receiving vehicle motion signals comprising a lateral acceleration signal, a longitudinal acceleration signal, and a yaw angular acceleration signal from one or more inertial measurement units (IMUs) mounted on the vehicle;
receiving image data from a forward facing camera mounted on the vehicle and processing the image data to generate a lane-center signal;
continuously sampling each of the lateral acceleration, longitudinal acceleration, yaw angular acceleration and lane-center signals to obtain a plurality of sample sets;
feeding each sample set into a recurrent neural network (RNN) to determine whether the sample set matches a driving automation control signature;
when the sample set matches the driving automation control signature, determining that the driving automation system is engaged;
when the sample set does not match the driving automation control signature, determining that the driving automation system is disengaged;
storing each sample set that matches the driving automation control signature with corresponding image data to generate a plurality of driving automation scenarios; and
exporting the plurality of driving automation scenarios to one or more remote systems for further processing.

* * * * *